(12) United States Patent
Kim

(10) Patent No.: US 6,171,853 B1
(45) Date of Patent: Jan. 9, 2001

(54) METHOD AND APPARATUS FOR TREATING VOLATILE ORGANIC COMPOUND (VOC) AND ODOR IN AIR EMISSIONS

(76) Inventor: Byung Joon Kim, 2004 Mayfair Rd., Champaign, IL (US) 61821

( * ) Notice: Under 35 U.S.C. 154(b), the term of this patent shall be extended for 0 days.

(21) Appl. No.: 09/131,909

(22) Filed: Aug. 10, 1998

(51) Int. Cl.[7] .................................................. C12M 1/16
(52) U.S. Cl. ..................................... 435/299.1; 435/298.1
(58) Field of Search ............................... 435/299.1, 266, 435/298.1, 298.2; 210/619, 150; 96/288; 55/290; 261/80

(56) References Cited

U.S. PATENT DOCUMENTS

| 700,858 | 5/1902 | Thomas . |
| 2,076,305 | 4/1937 | Strindberg . |
| 4,303,420 | 12/1981 | Howard . |
| 4,378,980 | 4/1983 | Long . |
| 4,407,954 | * 10/1983 | Clyde ................................ 435/299.1 |
| 4,673,514 | 6/1987 | Casey et al. . |
| 4,999,302 | * 3/1991 | Kahler et al. ...................... 435/299.1 |
| 5,766,938 | * 6/1998 | Hongo ................................ 435/299.1 |
| 5,780,293 | * 7/1998 | Seagle . |

FOREIGN PATENT DOCUMENTS 0 253 774 * 1/1988 (EP) .................................. 435/299.1

* cited by examiner

Primary Examiner—William H. Beisner

(57) ABSTRACT

An air emissions treatment system is characterized by a moving biomass filter element which alternately passes through the air being treated and a nutrient laden liquid to remove pollutants from the air. The filter element is in the form of one or more endless loops which are conveyed within an enclosed housing. As a section of the filter element passes through the air, it withdraws pollutants therefrom. When the filter passes through the liquid, it receives moisture and nutrients and releases the pollutants into the liquid.

6 Claims, 4 Drawing Sheets

METHOD AND APPARATUS FOR TREATING VOLATILE ORGANIC COMPOUND (VOC) AND ODOR IN AIR EMISSIONS

BACKGROUND OF THE INVENTION

This invention relates to a method and apparatus for treating volatile organic compounds (VOCs), air toxics, and odors in air emissions. A biofilter is a relatively new biological treatment device to convert VOCs and odor to carbon dioxide and water using biologically active soil, compost, or biofilm on a filter media. The existing biofilters have many drawbacks including frequent clogging and uneven distribution of water and air in the existing biofilter media. Water, nutrients, and air pass through only channels in the existing biofilter media using a limited volume of the media. Clogging often requires labor or energy intensive backwash or frequent replacement/turnover of the media. The object of the present invention is to develop an improved biofilter system that effectively treats VOCs, air toxics, and odor in air emissions by uniformly distributing nutrients, water, air pollutants, and oxygen to biomass grown on the entire volume of media and by eliminating frequent backwash or replacement of media.

BRIEF DESCRIPTION OF THE PRIOR ART

The use of soil beds for treating odorous server gases has been known for many years, as evidenced by the Pomeroy U.S. Pat. No. 2,793,096. A limited number of soil beds were used in the United States, primarily for odor control until the 1980s. In Europe, biofilters have been successfully used to treat VOCs and odors, and such use has been particularly cost effective for VOCs in low concentrations. Owing to more stringent environmental requirements, there has recently been renewed interest in biofilters in the United States.

A conventional biofilter includes beds of biologically active material, mixtures of compost, peat, or soil. Recently, other types of media with synthetic materials and ceramics were also used. When a contaminated air stream, often humidified, is vented through the biofilter with sufficient detention time, i.e. (on the order of tens of seconds to minutes), air contaminants will diffuse into the biofilm. The biofilm or biomass under aerobic condition will break down pollutants and nutrients into carbon dioxide and water. A variation of the biofilter is the biotrickling filter. In a biotrickling filter system, water with nutrients is sprayed on the biofilter media and a contaminated air stream is fed in co-current or counter-current directions with trickling water. The trickling water serves as a wetting agent as well as provides nutrients to the biomass.

In a conventional biofilter and a biotrickling filter, major problems are the clogging of voids in the filter and the difficulty with uniformly distributing the contaminated air stream, nutrients, and oxygen to the biomass. Air and trickling water streams often take the shortest path. With continued use, channels form through an irregular void. Consequently, water and air flow only through channels so that only a part of the total volume of media is used to treat the contaminated air. For the same reason, it is difficult to maintain an aerobic system throughout the entire bed and media can dry up. Frequently, media replacement or turnover is needed. U.S. Pat. No. 5,413,936 discloses rotation of a cylindrical vessel having a horizontal, longitudinal axis filled with a biofilter medium for effective turn over.

SUMMARY OF THE INVENTION

Accordingly, it is a primary object of the invention to provide an improved method and apparatus for removing pollutants from air emissions. The apparatus includes a housing having water arranged in a lower portion thereof and having an air emission supply in the upper portion. A biomass filter in the form of an endless element is displaced through the housing along a path wherein a section of the filter alternately passes between the upper and lower portions of the housing for air and water contact, respectively. When the filter section is in the housing upper portion, it withdraws pollutants from the air emissions and when the filter is in the housing lower portion, it receives moisture and nutrients from and releases pollutants into the water.

The biomass filter element preferably comprises a sponge-type foam material sandwiched between two layers of mesh with a frame at opposite ends. The frame is mounted on a chain which is driven by sprockets and around pulleys within the housing for continuous movement along a fixed path.

BRIEF DESCRIPTION OF THE FIGURES

Other objects and advantage of the invention will become apparent from a study of the following specification when viewed in the light of the accompanying having, in which.

DETAILED DESCRIPTION

Figure 1:
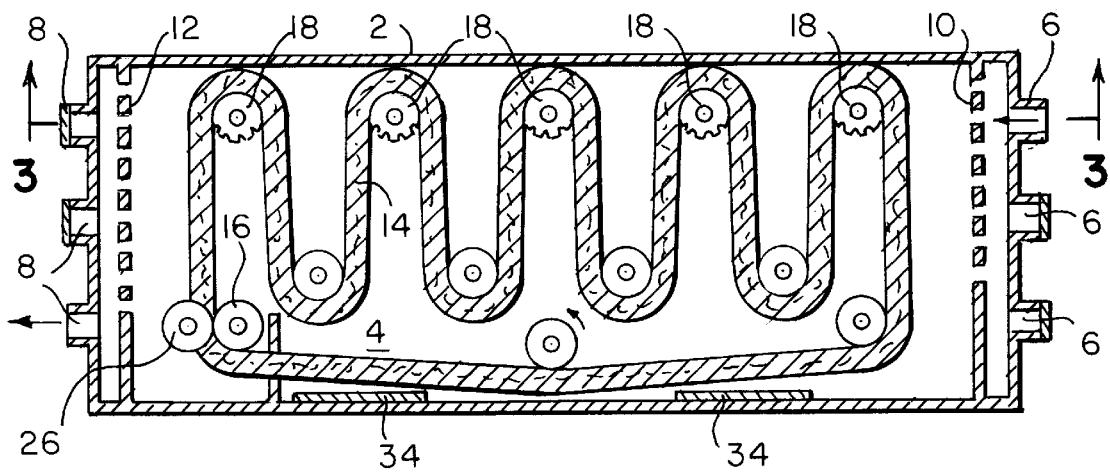
FIG. 1 is a sectional plan view of the interior of the air emission treatment system according to a first embodiment of the invention.

Referring to FIG. 1, the apparatus for removing pollutants such as volatile organic compounds (VOCs) and odor from air emissions will be described. The apparatus includes a generally rectangular housing 2 the lower portion of which contains a liquid 4 such as water which may be supplemented with nutrients. The housing includes at least one air pollutant inlet 6 and at least one clean air outlet 8 for the flow of air being treated through the upper portion of the housing. An apertured plate 10 is arranged within the housing adjacent the inlet 6 to evenly disperse the air emissions through the housing upper portion. Similarly, an apertured plate 12 is also provided adjacent the outlet 8.

A biomass filter 14 is arranged within the housing and serves as the primary element for treating air emissions in the upper portion of the housing by removing pollutants and odor therefrom. The filter 14 is preferably an endless element which is transported around a series of pulleys 16 and sprockets 18 in a serpentine fashion so that a section of the filter alternately passes between the water 4 in the housing lower portion and the air emissions in the housing upper portion.

Figure 2:
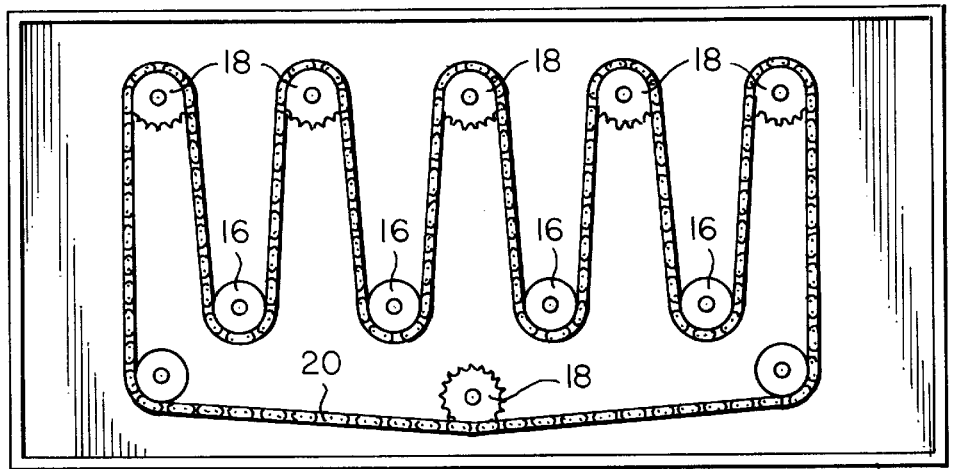
FIG. 2 is a plan view of the drive system for the embodiment of FIG. 1.
Figure 3:
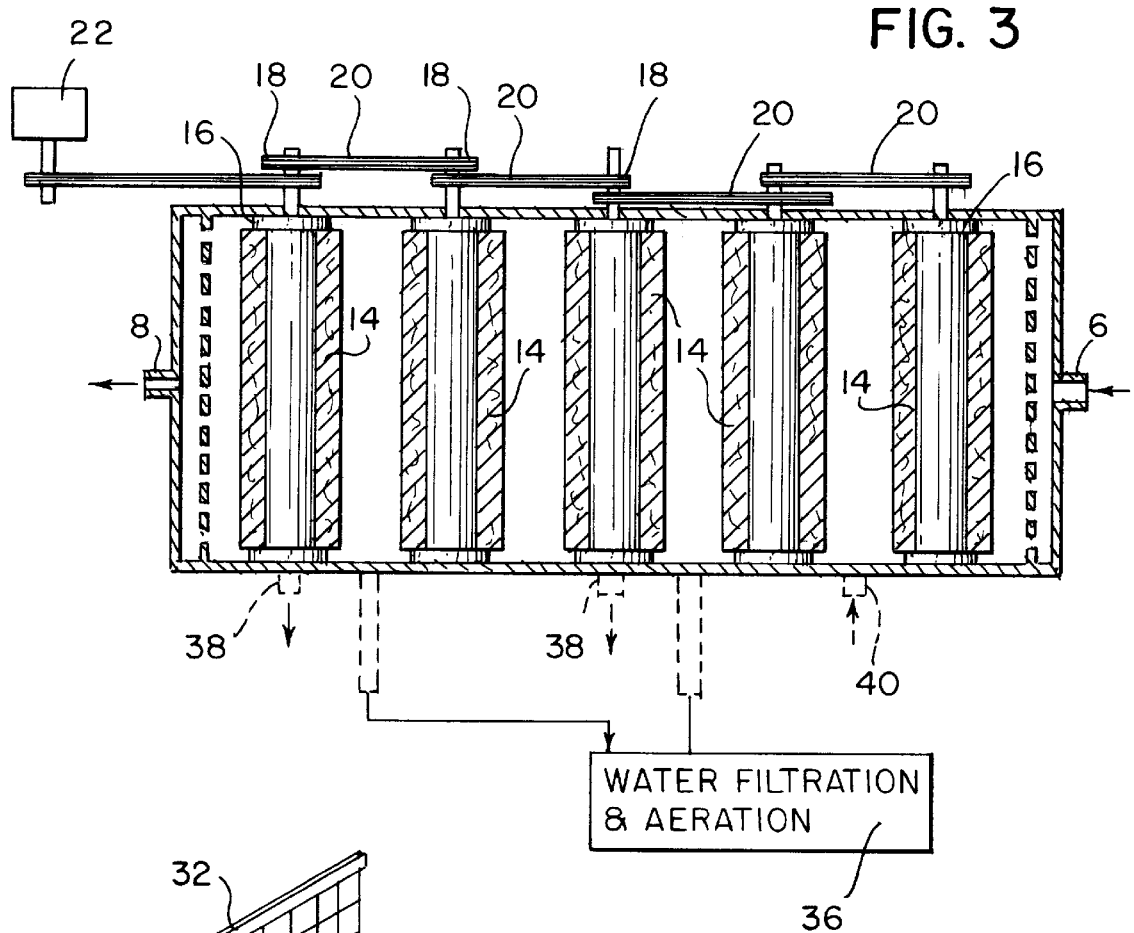
FIG. 3 is a sectional view of the treatment system taken along line 3—3 of FIG. 1.

The pulleys 16 are connected with sprockets 18 of a drive system shown in FIGS. 2 and 3. More particularly, a drive chain 20 is driven off a motor 22 to rotate the sprockets and pulleys to displace the filter element through the housing. As shown in FIG. 1, the lower run of the filter element is below the water surface to saturate the filter with the water. Before exiting the water and beginning the serpentine run, the filter element passes through a baffle 24 and between a pulley 16 and a squeegee roller 26 to remove excess liquid from the filter. The degree of liquid removed from the filter can be adjusted by repositioning the squeegee roller 26 to increase or decrease the pressure applied to the filter element against the pulley.

Figure 5:
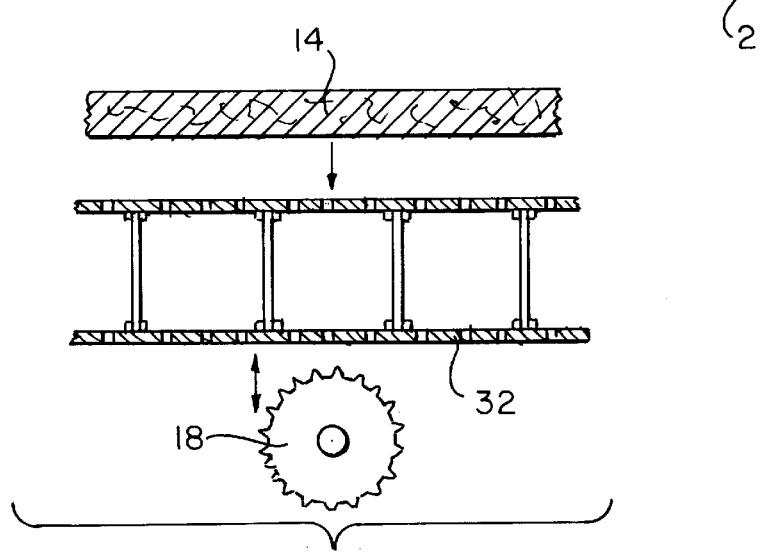
FIG. 5 is an exploded view of the mounting arrangement for the filter element on the drive system
Figure 4:
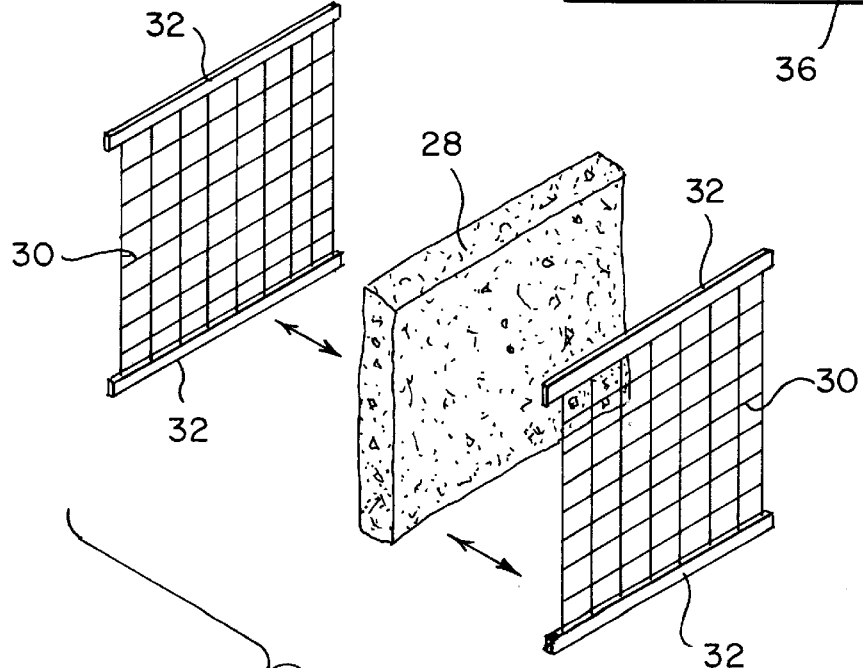
FIG. 4 is an exploded view of a section of the biomass filter element.

As shown in FIG. 4, the biomass filter 14 comprises a central sponge-like member 28 containing a plurality of pores sandwiched between two layers of mesh material 30. A flexible frame 32 at the top and bottom of each layer of mesh material is provided to secure the layers of mesh together with the sponge-like member 28 arranged therebetween. Referring to FIG. 5, the frame 32 engages the sprockets to transport the filter element 14 through the housing.

The transport speed of the biomass filter element through the housing is controlled by the motor 22. By moving the biomass through the housing, uniform distribution of nutrients, oxygen and moisture is enhanced which increases the efficiency of the biomass filter. The transport speed can be varied between 1 cm/min and 1 m/min.

The bottom of the housing contains a pair of aerators 34 through which liquid is recirculated to the housing from a water filtration and aeration supply 36. The aeration provides oxygen to biomass suspended in the water for further destruction of pollutants. Drains 38 in the housing are provided to withdraw water from the housing lower portion and deliver it to the filtration supply 36. A fluid inlet 40 is also provided for adding water and nutrients to the housing and to control the depth of the fluid.

The biomass filter element is an effective media for growing biofilm and treated contaminated air. As the filter element alternately travels in the air and through the water, the biomass on the media treats pollutants during the air cycle and receives moisture and nutrients and releases excess biomass into the water during the water cycle. Growth of microorganisms on the biomass is enhanced by controlling the addition of water and nutrients through the inlet 40.

Contaminated air is delivered to the housing via the inlets 6. When contaminants in the air stream are lighter than air, they are fed through the bottom inlet and treated air is collected from the top outlet. For heavier pollutants, the top inlet and bottom outlet are used.

If the system requires more treatment than one reactor can accommodate, another reactor can be added in sequence.

Figure 6:
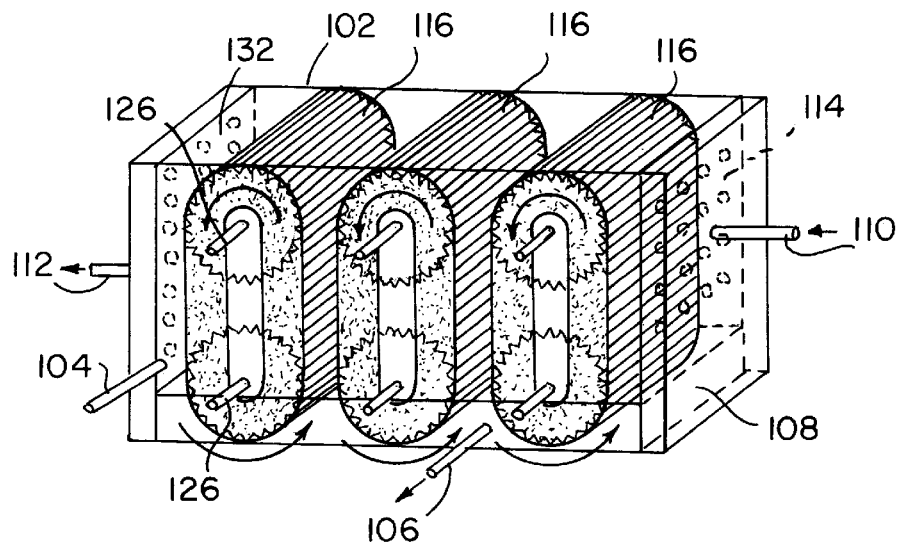
FIG. 6 is a schematic view of the interior of the air emission treatment system according to a second embodiment of the invention.

Turning now to the embodiment of FIG. 6, the housing 102 contains a water inlet 104 and a water outlet 106. The depth of water 108 in the bottom of a chamber within the housing can be adjusted for the best performance. The housing further includes an air inlet 110 and an air outlet 112 for distributing air within the upper part of the chamber. The air inlet and outlet are appropriately located in the same manner as elements 6 and 8 in FIG. 1. Adjacent to the air inlet is an air distribution panel 114 which spreads the air from the inlet evenly through the upper portion of the chamber. A further panel 132 distributes air to the outlet 112.

Figure 7:
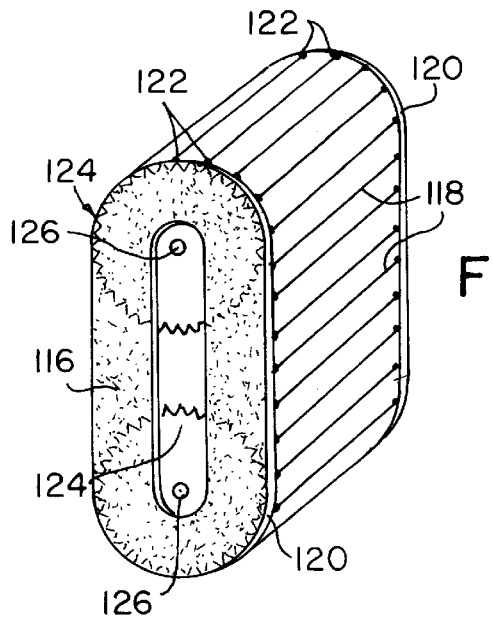
FIG. 7 is a perspective view of one of the filter elements of the embodiment of FIG. 6.

The chamber includes a plurality of foam-like filter media 116 which have an oblong cross-sectional configuration as shown in FIG. 7. Each filter is hollow and includes a plurality of lateral struts 118 to retain the foam member and connect it with a drive chain 120 via pins 122. The chain engages a sprocket 124 at the upper and lower reaches of the media, each sprocket being coaxially mounted on a horizontal drive axle 126.

Figure 8:
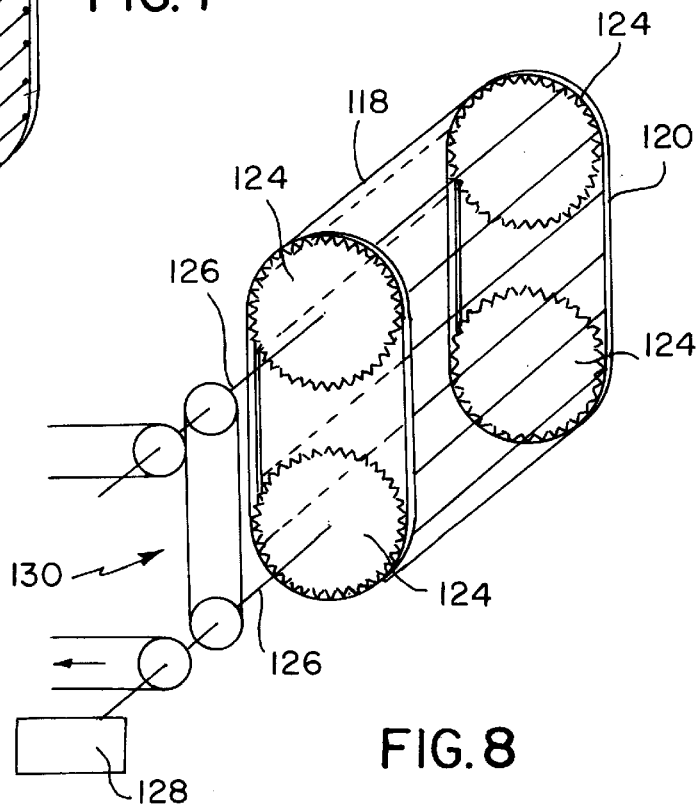
FIG. 8 is an exploded view of the mounting arrangement for the filter of FIG. 7.

As shown in FIG. 8, drive mechanism rotates the media about horizontal drive axles 126. More particularly, a motor 128 is connected the drive axles via additional sprocket and chain assemblies 130 to rotate all of the filter media in the same direction within the housing, whereby a segment of each filter media is alternately passed through the water and air in the lower and upper portions of the housing chamber, respectively. The motor provides a variety of traveling speeds for the filter media. Each filter medium contains a biomass which treats air pollutants during the air cycle. Then the biomass receives moisture and nutrients and releases excess biomass into the water during the water cycle.

Preferably, the filter is formed of a sponge-type material with varying pore sizes. The material is compressible and readily receives the biofilm. The material is also characterized by good hydrophilicity and durability. If excess biomass is a problem, two rollers can be installed on opposite sides of the medium to squeeze and drain the biomass-containing water.

Figure 9:
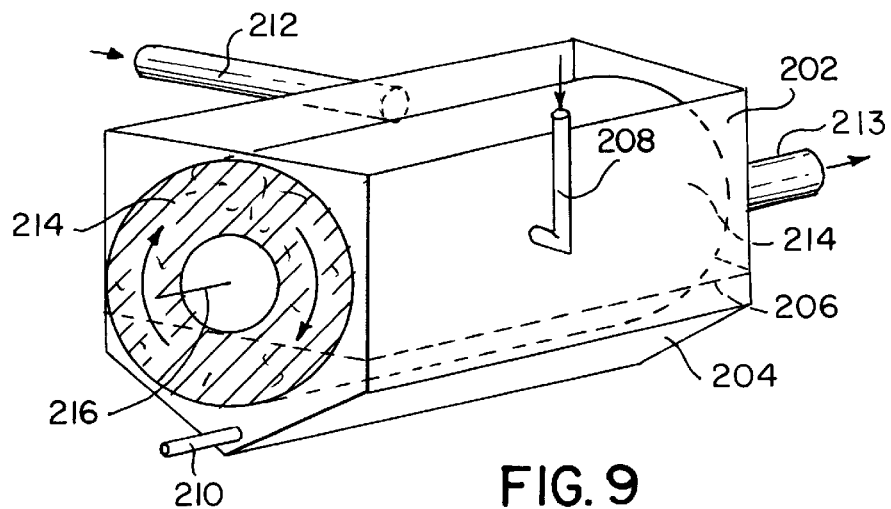
FIG. 9 is a perspective cut-away view of the air emission treatment system according to a third embodiment of the invention.

Referring now to the third embodiment shown in FIG. 9, the housing 202 has a v-shaped bottom 204 in which water 206 is retained. Water is supplied to the interior of the housing via an inlet 208 and drained from the housing via an outlet 210. Air is supplied to the upper part of the housing via an inlet 212 and is exhausted from the housing via an outlet 213. A cylindrical filter member 214 is mounted for rotation within the housing about a horizontal axis 216 so that a segment of the filter passes between the housing lower and upper portions for alternate submersion within the water and passage through the air. A drive mechanism (not shown) including a motor connected with a drive shaft coaxial with the filter is used to rotate the filter in a manner similar to that described above in connection with the embodiment of FIGS. 6–8.

Figure 10:
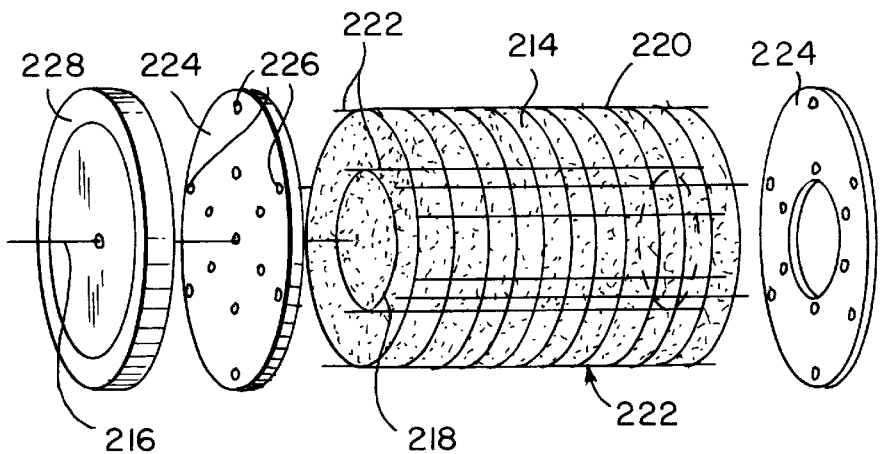
FIG. 10 is an exploded view of the filter element of the embodiment of FIG. 9.

As shown in FIG. 10, the filter member 214, which is formed of a foam-type material as described above, is retained between an inner cylindrical basket 218 and an outer cylindrical basket 220. The inner and outer baskets include horizontal bars 222 which extend beyond the ends of the filter member for connection with end caps 224 via nuts 226 which are threaded on the ends of the shafts. A cover and gasket 228 seals the forward end of the filter where it receives a drive shaft of the drive mechanism.

Figure 11:
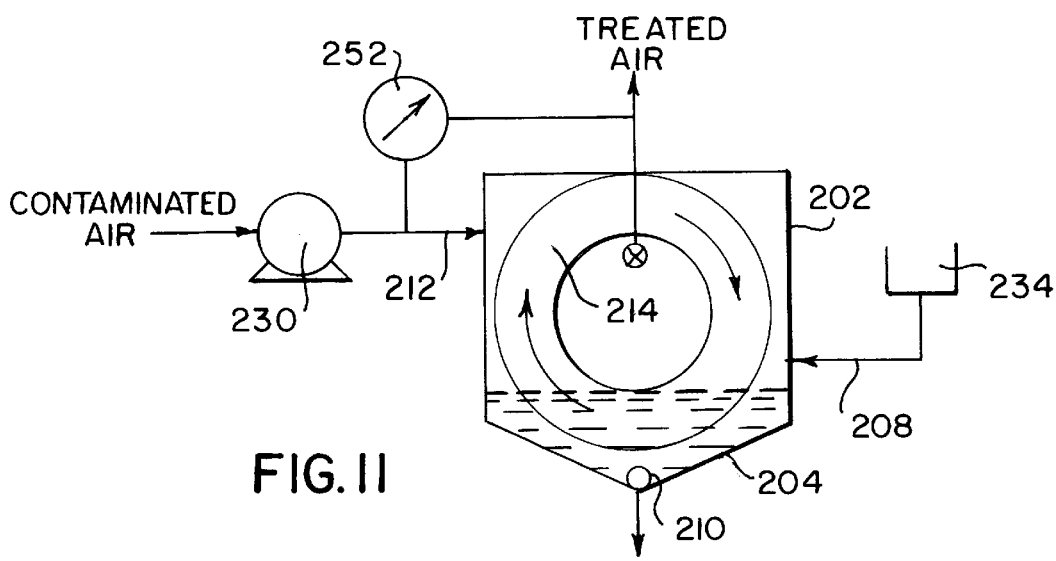
FIG. 11 is an end interior view of the system of FIG. 9.

Referring now to FIG. 11, air to be treated is supplied to an air pump 230 which pumps the contaminated air into the housing via the inlet 212. A pressure gage and controller 232 is provided between the air inlet and outlet to control the air pressure within the housing. The air outlet is arranged at a location within the inner circumference of the filter member. This insures that air to be treated within the housing is drawn through the filter member 214 prior to exiting the housing. A fluid reservoir 234 is connected with the water inlet 208 to supply fluid and nutrients thereto. The water can be aerated for further treatment of pollutants in water as necessary as in the embodiment of FIG. 1.

One advantage of the system of FIGS. 9–11 is increased control over the submersion time of the filter and over the air flow through the housing. When the pressure difference between the air inlet and outlet reaches a predetermined limit, the filter can be rotated at a much higher speed to remove excessive biomass. This high speed rotation uses centrifugal forces to clean the filter and prevent clogging. The V-shaped bottom of the housing also facilitates the collection and removal of sludge.

The treatment process can be optimized by varying the following parameters: the travel speed of the filter; the total area and number of layers of air exposed to the biomass filter; the duration of the air and water (drying and wetting) cycles; the nutrient ingredients and their concentrations; and the inlet and outlet air pressures.

Additional water treatment via aeration and microfiltration as well as recycling can be provided in the filtration system of the invention if desired. Aeration will break excess organics and microfiltration will remove particles and microorganisms of bacterial size or larger. If desired, the bottom of the housing can be inclined (V-shaped) to facilitate settling and collection of sludge.

While in accordance with the provisions of the patent statute the preferred forms and embodiments of the invention have been illustrated and described, it will be apparent to those of ordinary skill in the art that various changes and modifications may be made without deviating from the inventive concepts set forth above.

What is claimed is:

1. Apparatus for removing pollutants from air emissions, comprising:
   (a) a housing defining a single chamber having a lower portion containing a liquid;
   (b) means for supplying air emissions to be treated to an upper portion of said chamber;
   (c) biomass filter means arranged within said chamber for treating pollutants within the air emissions, said filter means comprising a unitary filter element formed of a sponge-type foam material having a biomass thereon for growing biofilm and microorganism when said material is exposed to liquid and nutrients and having a cylindrical configuration with a horizontal axis; and
   (d) means for rotating said filter element about said axis and through said upper and lower portions of said chamber, whereby when said filter element is in said chamber upper portion, it withdraws pollutants from the air emissions, and when said filter element is in said chamber lower portion, it receives moisture and nutrients from and releases pollutants into said liquid.

2. Apparatus as defined in claim 1, wherein said displacing means comprises a sprocket and chain drive assembly.

3. Apparatus as defined in claim 2, and further comprising means for controlling the depth of said liquid in said housing lower portion.

4. Apparatus for removing pollutants from air emissions, comprising:
   (a) a housing defining a single chamber having a lower portion containing a liquid;
   (b) means for filtering and aerating said liquid;
   (c) means for supplying air emissions to be treated to an upper portion of said chamber;
   (d) biomass filter means arranged within said chamber for treating pollutants within the air emissions, said filter means comprising a unitary filter element formed of a sponge-type foam material and having a cylindrical configuration with a horizontal axis; and
   (e) means for rotating said filter element about said axis and through said upper and lower portions of said chamber, whereby when said filter element is in said chamber upper portion, it withdraws pollutants from the air emissions, and when said filter element is in said chamber lower portion, it receives moisture and nutrients from and releases pollutants into said liquid, said housing having a V-shaped lower portion to facilitate the removal of sludge from the bottom of said housing.

5. Apparatus as defined in claim 4, and further comprising means for removing excess liquid from said filter element as it exits said housing lower portion at the end of a return path of said displacing means.

6. Apparatus as defined in claim 5, wherein said housing further comprises an apertured plate adjacent said air emissions supplying means for evenly distributing air emissions through said housing upper portion.

* * * * *